April 30, 1968   J. A. PHARRIS ET AL   3,380,100
PAINT TRAY
Filed Oct. 22, 1965

Inventors:
John A. Pharris
Erik Henningsen
By Hofgren, Wegner,
Allen, Stellman & McCord
Attys

United States Patent Office 3,380,100
Patented Apr. 30, 1968

3,380,100
PAINT TRAY
John A. Pharris and Erik Henningsen, Milwaukee, Wis.,
assignors to E Z Paintr Corporation, a corporation of
Delaware
Filed Oct. 22, 1965, Ser. No. 500,759
2 Claims. (Cl. 15—257.06)

ABSTRACT OF THE DISCLOSURE

A one piece paint tray for use with a paint roller including a bottom wall having an inverted V-shaped central portion with a rectangular surface at each end of said portion for supporting the tray. An upstanding side wall extends around the periphery of the bottom wall whereby spaced and separate paint reservoirs are provided at each end of the tray, with the central portion of the bottom wall defining roll-out areas adjacent each of the paint reservoirs.

---

The present invention relates to paint containers and more particularly to a paint tray for use with a roller type paint applicator.

In the conventional paint tray, such as that shown in the Bernhardt Patent No. 2,922,176, the receptacle is generally rectangular in shape and has a paint well at one end and upwardly sloping bottom wall extending from the well to the other end of the tray. Legs must be provided for the shallow end of the tray to maintain the paint pool at the well end of the tray. This prior art paint tray construction has several disadvantages which are obviated by applicants' new and improved paint tray configuration.

The present invention relates to a paint tray configuration having a generally rectangular shape with two paint wells generally defined by an inverted V-shaped bottom wall. With this simplified and improved construction applicants have obviated many of the disadvantages in the single well tray construction and moreover have substantially reduced the manufacturing and shipping costs incident to marketing paint trays. By providing two paint wells, one at each end of the paint tray, the tray has greater stability lessening the danger of the tray tipping over during the filling operation or when in use. In the single well construction this tipping is a severe problem as the pool of paint in the well is always at one end of the tray resulting in a severe imbalance. Further, the improved double well paint tray of the present invention eliminates the necessity for many of the parts normally used in constructing the conventional single well tray. As the present double well construction has receptacles at each end of the tray which fully support it, the shallow end legs or supports necessary on the single well construction become unnecessary substantially reducing the cost of manufacture of the paint tray. Also, the V-shaped bottom wall eliminates the necessity for a shallow end vertical wall normally employed in the single well construction. This vertical wall was previously necessary to prevent spillage of the paint from the shallow end. However, in the present construction any spillage from the shallow portion of the tray, which is actually in the center of the tray, merely flows into the well at the other end of the tray.

It is, therefore, a primary object of the present invention to provide a new and improved paint tray having two paint wells one at each end of the paint tray. By providing two wells with a common roll out area for both wells, more efficient use of the paint tray results. This is a substantial advantage as a given quantity of paint can be distributed in the present two well tray to a much lesser pool depth than is possible in the single well tray construction. Regardless of the depth of the well the paint pool should have a depth substantially less than the radius of the roller applicator to prevent immersing the roller frame in the paint pool and for this reason the present two well tray is more efficient. In contrast to the conventional single well tray, the present double well tray may be used by the painter from either side of the tray without moving the tray to a new position and this further reduces the likelihood of the painter spilling the paint from the well.

Another object of the present invention is to provide a new and improved paint tray having two paint wells, one at each end of the tray defined by an inverted V-shaped bottom wall, which cost substantially less to manufacture and distribute than a similar size single well tray. Because the double well construction is inherently stronger and more stable than the conventional single well paint tray, the double well paint tray may be constructed of a lighter sheet metal reducing the total cost of the product. The present double well paint tray may be manufactured by a single stamping without the need for additional fabricating steps necessary in the making of a single well paint tray. Shipping costs are also significantly reduced in comparison to the single well construction, as the present double well paint tray is lighter in weight. Also because the present double well tray will nest easily, smaller and less costly shipping containers may be employed.

Other objects and advantages will become readily apparent from the following detailed description taken in connection with the accompanying drawings, in which.

Figure 1:
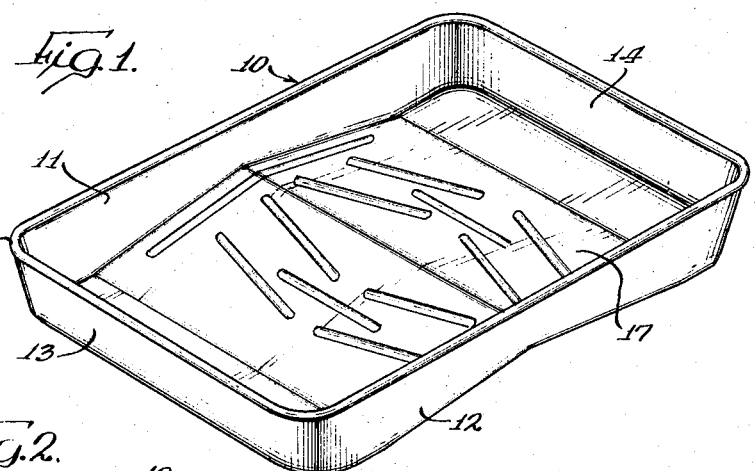
FIGURE 1 is a perspective view of the paint tray of the present invention.

While an illustrative embodiment of the invention is shown in the drawings and will be described in detail herein, the invention is susceptible of embodiment in many different forms and it should be understood that the present disclosure be considered as an exemplification of the principles of the invention and is not intended to limit the invention to the embodiment illustrated. The scope of the invention will be pointed out in the appended claims.

Figure 2:
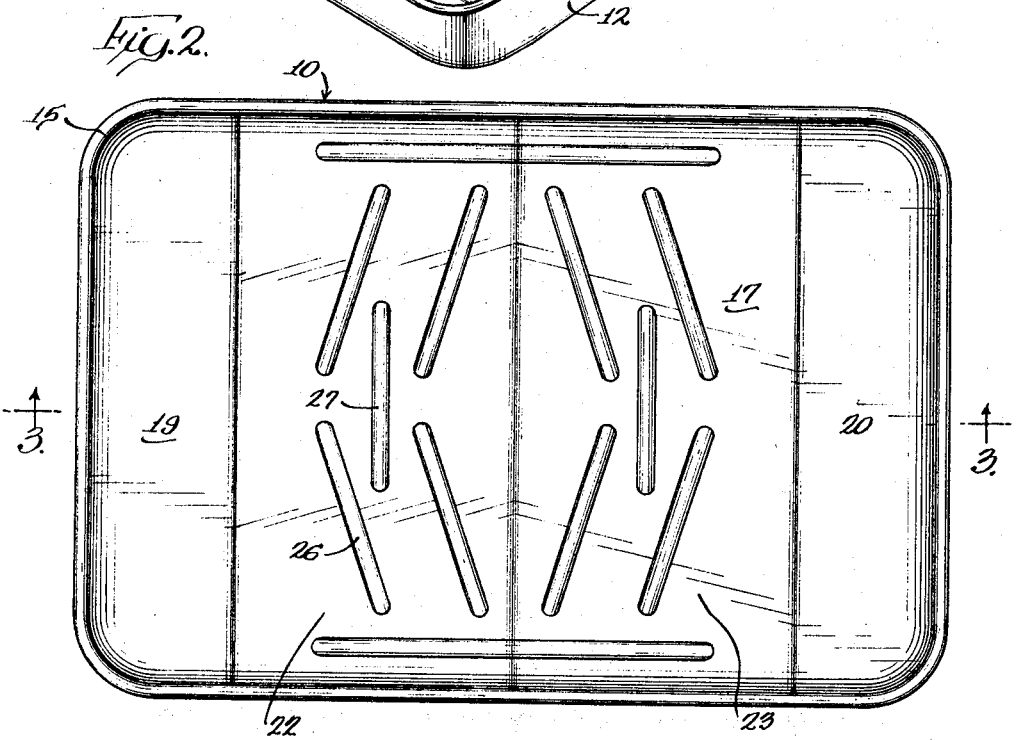
FIGURE 2 is a plan view showing the two wells at either end of the tray and the central roll out area.
Figure 3:
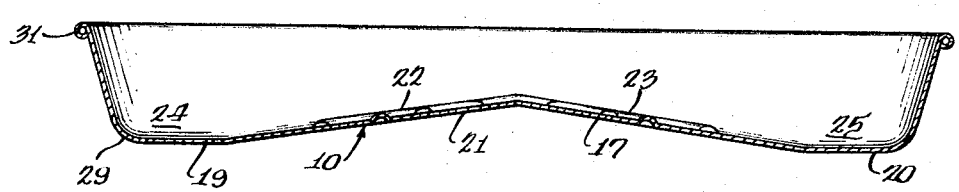
FIGURE 3 is a cross section taken generally along line 3—3 of FIGURE 2, showing the bottom wall configuration.

Referring now to FIGURES 1 to 3, a paint tray or container generally designated by the numeral 10 is provided for containing two pools of paint into which the painter may roll a suitable roller type paint applicator. The paint tray 10 may be formed by a one piece stamping from suitable sheet metal stock. Generally side walls 11 and 12 are joined with generally end walls 13 and 14 with the juncture of the side and end walls being curved as shown at 15 in FIGURE 2. The upper edges of the side and end walls 11 to 14 lie in a common plane. A suitable continuous bead 16 may be formed on the upper edges of the side walls 11 and 12 and the end walls 13 and 14.

A bottom wall 17 is joined with the side walls 11 and 12 and the end walls 13 and 14 completing the receptacle. The bottom wall 17 has two horizontal planar portions 19 and 20 joined by an inverted V-shaped portion 21 defining roll out surfaces 22 and 23. The side and end walls 11 to 14 and the bottom wall 17 define separate receptacles or wells 24 and 25 which are adapted to receive pools of paint to be applied to the paint roller.

The roll out areas 22 and 23 have inclined ribs 26 and horizontal ribs 27 for the purpose of pressing excess paint from the roller and also for frictionally engaging the roller and maintaining it in the roll out area when not in use. The bottom wall is formed integrally with the side and end walls 11 to 14 and has curved portions 29 at their junctures. As is evident from FIGS. 2 and 3, the side walls 11 and 12 and the end walls 13 and 14 are disposed at a slight angle with respect to bottom wall 17 to facilitate stacking a plurality of the paint trays 10 for shipping and storage.

In use the painter may fill both wells 24 and 25 of the paint tray 10 by pouring paint in the tray on the apex of the inverted V-shaped portion 21 of the bottom wall 17 dividing the flow to the two wells. Both wells 23 and 24 may in this manner be filled simultaneously. The painter may apply paint to the roller from either well 24 or well 25 depending upon which is more convenient, but may use both roll out areas 22 and 23 for pressing excess paint from the roller regardless of his position with respect to the paint tray 10. It will be appreciated that the effective total well area in the wells 24 and 25 is substantially greater than the well area in a single well tray without sacrificing the size of the roll out area.

As cost considerations are extremely important in the construction and marketing of paint trays it might be well to examine some exemplary cost differentials between a conventional tin plated seven inch tray and a double well tray of the present invention of comparable over-all size. The cost of the sheet metal for the conventional tray and legs is .0975 dollars as opposed to .0576 dollars for the sheet metal in the present double well tray, resulting in a cost of material savings of approximately .0399 dollars or 41%. The labor involved in fabricating the tray and legs of the conventional single well tray is .0227 dollars while the cost in fabricating the present double well tray is .0166 dollars, resulting in a labor saving of .0061 dollars or 22%. Including a reasonable burden cost the total savings on the double well tray would be approximately .0564 dollars per tray, or 36% over the single well tray. These savings reflect manufacturing cost only and do not include the significant savings in shipping and packing which result from the lesser weight of the double well tray and the nesting characteristic of the double well trays which reduce the packaging container size.

We claim:

1. A paint tray for use with a paint roller comprising: a bottom wall including an inverted V-shaped portion having ribs on each of the legs of the V for assisting in the removal of excess paint from the roller the legs of the V being positioned at an obtuse angle with respect to one another, the ends of said legs having a substantially horizontal surface, said horizontal surfaces being substantially coplanar whereby the tray is supported on said surfaces, side walls extending generally vertically from said bottom wall, and end walls extending generally vertically from said bottom wall, said end walls joining said side walls and having upper edges lying in the same horizontal plane as the upper edges of said side walls to thereby form two paint receptacles.

2. A paint tray for use with a paint roller, comprising: a bottom wall including an inverted V-shaped portion having two rectangular surfaces contiguous to each other along one end edge thereof, said edges defining the apex of said inverted V, the side edges of said surfaces lying in a common vertical plane, each of said surfaces having a horizontally extending portion along the other end thereof, a substantially flat side wall extending generally vertically upward from each of said side edges above said apex to prevent paint spillage the distance between said horizontally extending portions and the upper end of said side walls being only slightly greater than the distance between the upper end of said side walls and said apex, and end walls extending generally vertically from said horizontal portions of said bottom wall, said end walls being substantially perpendicular to said side walls and having upper edges lying in a common horizontal plane with the upper edges of said side walls.

References Cited

UNITED STATES PATENTS 3,280,418  10/1966  Schonberger _____ 15—264

FOREIGN PATENTS 559,080  6/1958  Canada.

CHARLES A. WILLMUTH, *Primary Examiner.*

L. G. MACHLIN, *Assistant Examiner.*